United States Patent

Takagi

[15] 3,704,767
[45] Dec. 5, 1972

[54] OIL-TYPE VIBRATION DAMPER

[72] Inventor: Tatsuya Takagi, 6-10, Araebisu-machi, Nishinomiya-shi, Hyogo-ken, Japan

[22] Filed: July 9, 1970

[21] Appl. No.: 53,548

Related U.S. Application Data

[62] Division of Ser. No. 738,281, June 19, 1968, Pat. No. 3,570,635.

[30] Foreign Application Priority Data

Dec. 11, 1967 Japan..................................42/79345
Jan. 10, 1968 Japan....................................43/1128
March 27, 1968 Japan.................................43/19435

[52] U.S. Cl....................................188/280, 188/320
[51] Int. Cl............................F16f 9/348, F16f 9/50
[58] Field of Search...............188/279, 280, 317, 320

[56] References Cited

UNITED STATES PATENTS 3,232,390 2/1966 Chano..................................188/280
3,379,286 4/1968 Takagi..................................188/280
2,244,501 6/1941 Pierce...................................188/284

FOREIGN PATENTS OR APPLICATIONS 677,176 8/1952 Great Britain.......................188/280

*Primary Examiner*—George E. A. Halvosa
*Attorney*—McGlew and Toren

[57] ABSTRACT

An oil-type vibration damper includes a piston and a cylinder, and either one or two sets of pressure control valves. With two sets of pressure control valves, one set effects damping of vehicles vibrations above supporting springs and the other set effects damping of vehicle vibrations below the supporting springs. When only one set of pressure control valves is used, this set effects damping of both vehicle vibrations, but with different response characteristics for each type of vehicle vibration. A pusher member detects changes in the frequency of vibrations to act automatically on either one pressure control valve or the single pressure control valve to either close the one pressure control valve or increase the resilient force on the single pressure control valve in accordance with the frequency of the vibrations.

3 Claims, 8 Drawing Figures

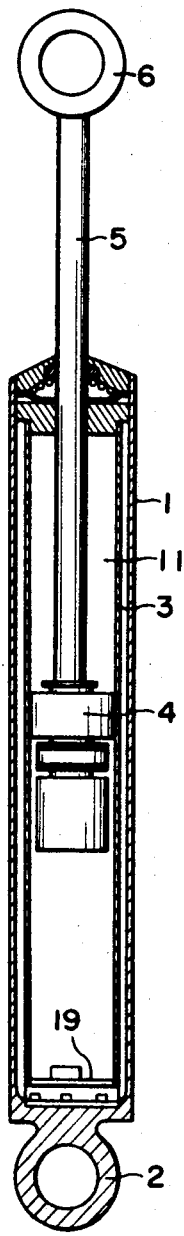
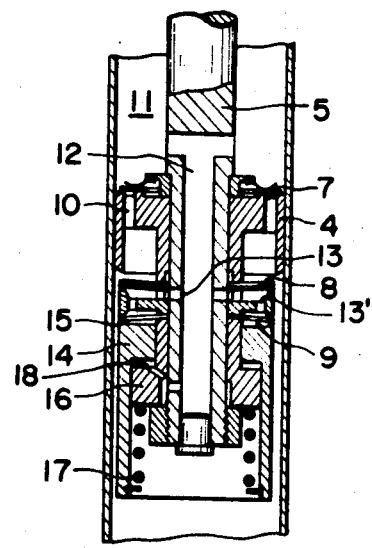

Characteristic curves of the oil damper showed in Fig. 4

OIL-TYPE VIBRATION DAMPER

CROSS-REFERENCE TO RELATED APPLICATION

This application is a division of application Ser. No. 738,281, filed June 19, 1968, for "OIL-TYPE VIBRATION DAMPER," now U.S. Pat. No. 3,570,635.

BACKGROUND OF THE INVENTION

Suspension systems for motor vehicles generally include include chassis or support springs interposed between the wheels and the body. The wheels are equipped with tires which constitute resilient members. Accordingly, the motor vehicles are subjected to two different systems of vibration, one including natural vibrations above the springs, hereinafter referred to as primary vibrations, and the other including natural vibrations below the springs, hereinafter referred to as secondary vibrations.

In most passenger motor vehicles, the primary vibration frequency is about 80 cycles per minute, ranging from 40 to 120 cycles per minute, and the secondary vibration frequency is about 600 cycles per minute, ranging from 400 to 1,000 cycles per minute. An oil damper or shock absorber is mounted between the wheels and the body to effect damping of the two vibration systems. However, since it is very difficult for a single oil damper or shock absorber to effect satisfactory damping of the two vibration systems vibrating at different frequencies, the present practice is to use an oil damper or shock absorber designed as a compromise of the different requirements of the two different frequency vibration systems.

When a motor vehicle operates on regular roads, such as roads having fairly smooth pavement, the use of an oil damper or shock absorber having a low damping force is conducive to increased riding comfort, because such an oil damper or shock absorber prevents transmission of impacts from the road resulting in vibrations below the springs. However, such an oil damper or shock absorber will cause jolting and tossing when the vehicle travels on bad roads, such as roads which are unpaved or have very poor pavement, and such jolting and tossing interfere with driving of the vehicle.

On the other hand, if the oil damper or shock absorber has an excessively high damping force when the vehicle is subjected to vibrations below the springs, as on bad roads, the wheels cannot accommodate themselves to irregularities of the road's surface and the vehicle cannot travel smoothly. The lack of sufficiently high damping forces under such conditions results in the development of resonance below the springs and insufficient contact of the wheels with the road surface. Since the solutions to these problems are contradictory to each other, it is impossible to obviate all of the problems, by means of known oil dampers or shock absorbers, without compromising with respect to the factors involved.

SUMMARY OF THE INVENTION

This invention relates to motor vehicle oil dampers or shock absorbers and, more particularly, to an improved oil damper or shock absorber having damping characteristics which vary with the frequency of the vibrations to be damped.

In accordance with one embodiment of the invention, an oil damper or shock absorber of the piston-cylinder-type is provided with two sets of pressure control valves therein. One set of pressure control valves, hereinafter referred to as primary valves, is adapted to provide damping force characteristics best suited to accommodate vibrations above the chassis springs. The other set of pressure control valves, hereinafter referred to as secondary valves, is adapted to provide damping force characteristics best suited to dampen vibrations occuring below the springs. For this purpose, the secondary valves have a weaker resilient characteristic than the primary valves. A pressure member is provided to sense a change in the frequency of the vibration, and acts automatically to push the secondary pressure control valves to close in the case of primary vibrations.

In another embodiment of the invention, one pressure control valve is adapted to provide damping characteristics for both types of vibrations. The pusher member, sensing a change in the frequency of the vibrations, automatically acts to increase the resilient force of this valve in the case of primary vibrations.

An object of the present invention is to provide an oil damper or shock absorber capable of effecting damping of both primary vibrations and secondary vibrations.

Another object of the invention is to provide an oil damper or shock absorber including two sets of pressure control valves, one set being adapted to provide damping force characteristics best suited to accommodate vibrations above the chassis springs of the vehicle and the other set being adapted to provide damping force characteristics best suited to dampen vibrations occuring below the springs of the vehicle.

A further object of the invention is to provide an oil damper or shock absorber including a set of pressure control valves whose resilient or spring characteristic is changed automatically, responsive to a change in the frequency of vibrations, to accommodate both vibrations of occuring above the chassis springs and vibrations occuring below the chassis springs.

For an understanding of the principles of the invention, reference is made to the following description of typical embodiments thereof as illustrated in the accompanying drawing.

BRIEF DESCRIPTION OF THE DRAWING

In the drawing:

FIG. 1 is a somewhat schematic longitudinal sectional view of one damper embodying the invention;

FIG. 2 is a partial central longitudinal sectional view of one form of piston constituting an essential element of an oil damper or shock absorber in accordance with the invention;

DESCRIPTION OF THE PREFERRED EMBODIMENTS

Figure 3:
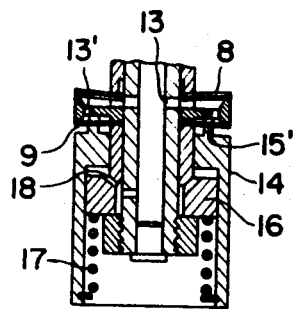
FIGS. 3 and 4 are views, similar to FIG. 2, illustrating alternative embodiments of the invention.

Referring to the drawings, FIG. 1 illustrates one example of an oil damper or shock absorber, embodying the invention, and which is of the dual action type developing a damping force during both the extension stroke and the compression stroke. The oil damper shown in FIG. 1 comprises an outer shell 1 having a lower end 2 arranged for attachment to a vehicle axle. Within shell 1, there is a pressure tube 3 slidably receiving a piston 4 connected to a piston rod 5 extending through the upper cover of outer shell 1 in fluid-tight relation and having an upper end 6 arranged for connection to the vehicle body.

Figure 4:
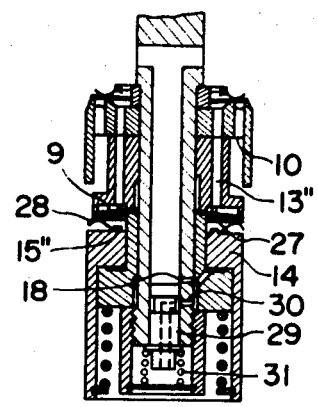

As shown in FIGS. 2 and 4, a one-way valve 7 is arranged on the upper surface of piston 4 and permits oil to move upwardly only through passages 10. Piston 4 also has incorporated therewith a primary valve 8 and a secondary valve 9 which permit oil to move downwardly only. Both valves 8 and 9 communicate with the upper oil chamber 11, above piston 4, through axial passage 12, in piston rod 5, and passages 13 and 13'. Valves 8 and 9 are made of thin hardened steel and are set to a concave valve seat so as to provide initial resilient force.

Pusher members 15 and 15' are disposed beneath secondary valve 9 for opening and closing valve 9 during operation of the oil damper, and a cylinder 14 moves the pusher members upwardly and downwardly. Floating cylinder 14 is in engagement with a piston 16 secured to piston rod 5 and communication with the upper oil chamber 11 is maintained through throttling duct 18. The floating cylinder 14 is pushed upwardly by the oil pressure in upper oil chamber 11, thereby to close secondary valve 9, by the pressure exerted between the floating cylinder and its associated piston 16. When the oil pressure in upper oil chamber 11 decreases, as in the stationary position of the oil damper, or during a compression stroke, springs 17 move floating cylinder 14 downwardly relative to piston 16 to provide for opening of secondary valve 9.

Secondary valve 9 has lesser damping force characteristics than does primary valve 8, with the characteristics of secondary valve 9 generally being in the range of from one-half to three quarters of the characteristic of primary valve 8.

Figure 5:
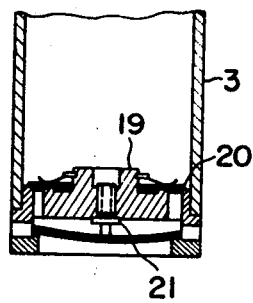
FIG. 5 is an axial sectional view of a pressure valve, for the compression stroke of the oil damper, positioned at the bottom end of the cylinder of the oil damper.

The lower end of pressure tube 3 is provided with a dual action valve 19 of a conventional type. As shown in FIG. 5, valve 19 includes a one-way valve 20 which permits oil to flow upwardly only, and a pressure control valve 21 which permits oil to flow downwardly only. During a compression stroke, valve 21 develops a damping force as a greater length of piston rod 5 enters into pressure tube 3. During extension, a quantity of oil corresponding to the upward movement of piston rod 5 flows through valve 20 into the chamber beneath piston 4.

In the extension stroke of the oil damper or shock absorber, one-way valve 7 is closed and oil pressure in upper oil chamber 11 increases as piston 4 moves upwardly. Secondary valve 9, which is operable by relatively low pressure, is opened and develops a small damping force during the time that primary valve 8 remains closed. If the vibration external forces have a high frequency, constituting a secondary vibration, the throttling effect of duct 18 prevents floating cylinder 14 moving pusher members 15 and 15' upwardly, so that secondary valve 9 operates and develops a small damping force during a secondary or high frequency vibration.

When the vibratory external forces to which the oil damper is subjected have a low frequency or primary vibration, a larger quanitity of oil flows through throttle duct 18, causing floating cylinder 14 to move pusher members 15 and 15' to close secondary valve 9. Under these conditions, primary valve 8 opens during the extension stroke, and generates stronger damping force.

The oil damper operates in the described manner during each cycle of vibration, whether at low frequency or at high frequency, and pusher members 15 and 15' are restored to their initial position acting on floating cylinder 14 by spring 17, at the end of each cycle, to prepare for the succeeding cycle.

In the embodiment of the invention shown in FIG. 2, secondary valve 9 is closed by pusher member 15 engaging the outer periphery of secondary valve 9. The pusher member 15', shown in FIG. 3, is so constructed that it engages the portion of disk valve 9 slightly inwardly from the outer periphery thereof. Thereby, disk valve 9 can have a higher spring constant, improving its characteristics. This arrangement provides for secondary valve 9 to open, when the pressure is excessively high, even after the valve has been closed by pusher member 15'. In this manner, the curve representing the damping force-speed characteristic can be made to have a gentler slope.

With respect to the previously described embodiment shown in FIG. 3, it should be noted that this can provide an increased riding comfort, which is characteristic of the present invention, even if primary valve 8 is omitted and only secondary valve 9 provided in the manner shown in FIG. 4. In this case, an additional disk 27 is arranged between floating cylinder 14 and disk valve 9 without exerting any pressure on disk valve 9, and a very weak spring 28 biases disk 27 into engagement with valve 9 without exerting any pressure on this valve.

Disk valve 9 has a characteristic suitable for the secondary vibrations in the case of high frequencies, but it has an increased characteristic, suitable for the primary vibrations, imposed by the additional disk 27 in the case of low frequencies.

Figure 6:
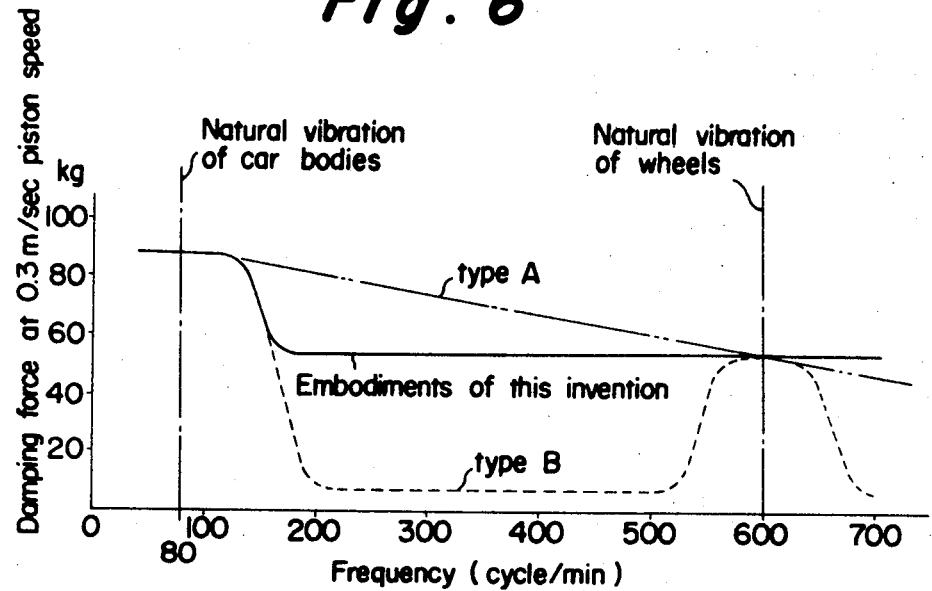
FIG. 6 is a diagram graphically illustrating the principles on which the present invention is based.

FIG. 6 illustrates the manner in which a damping force can be varied in accordance with the frequency of vibrations and with the piston speed remaining constant. An oil damper having the broken line characteristic B develops a damping force only when either primary vibrations or secondary vibrations are present. However, in actual operation, the vehicle wheels move while accommodating irregularities of the road surface, with the result that the vibrations to which the oil damper is subjected include vibrations of an intermediate frequency range as well as the two frequency ranges mentioned. The vibrations of the intermediate frequency range have the secondary vibrations superimposed thereon. Thus, an oil damper having the characteristic B does not develop a damping force in the intermediate frequency range, and thereby has the disadvantage that it cannot damp the secondary frequency superimposed on vibrations in the intermediate frequency range. For this reason, an oil damper having the characteristic B is not desirable.

An oil damper having the dot and dash line characteristic A, and as shown in U.S. Patent application Ser. No. 557,519, filed June 14, 1966, now U.S. Pat. No. 3,379,286, is also not desirable. Such an oil damper develops a very high damping force when subjected to a vibration of, for example, 300 cycles per minute, so that is has an overdamping effect on secondary vibrations superposed on the 300 cycle vibration thus reducing riding comfort.

The technical concept underlying the present invention, as shown in FIG. 6, is that the oil damper develops, in the intermediate frequency range, a degree of damping force sufficient to accommodate secondary vibrations which may be superposed on vibrations in the intermediate frequency range. Thus, an oil damper embodying the present invention is free from the disadvantages of oil dampers having the characteristics A and B.

Figure 7:
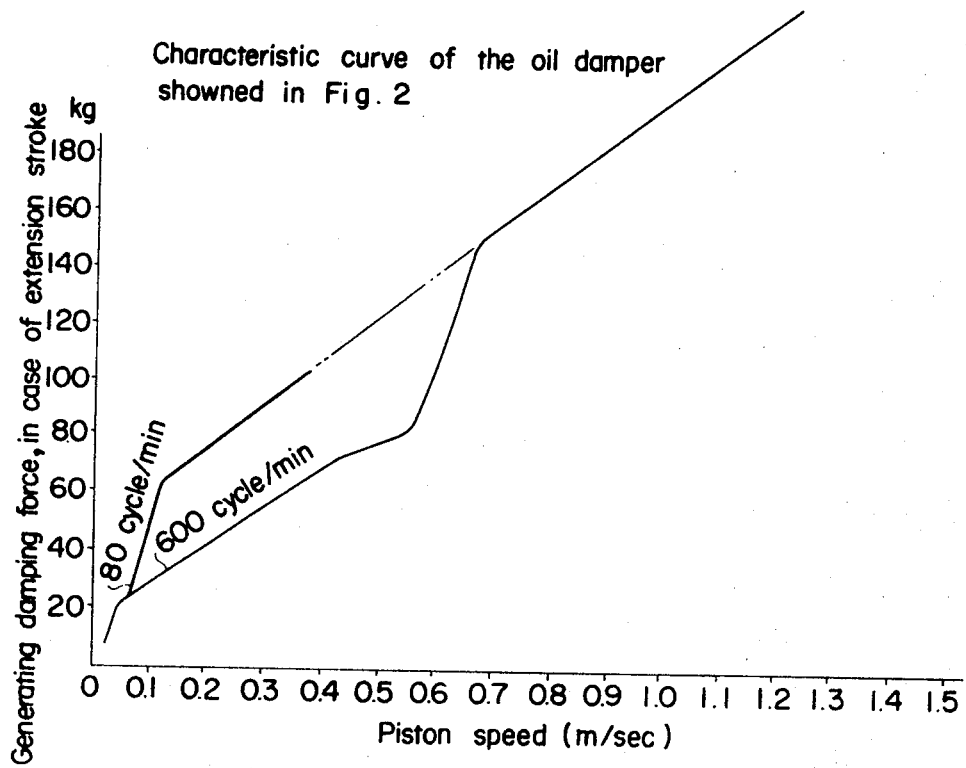
FIGS. 7 and 8 are diagram graphically illustrating the respective damping characteristics of two embodiments of the invention.

FIG. 7 illustrates the damping force-piston speed characteristic of the embodiment of the oil damper in accordance with the present invention shown in FIG. 2. In a conventional suspension system, the primary vibration does not produce a piston speed higher than 0.4 meter per second.

However, secondary vibrations produce a piston speed of 1.5 to 2.0 meters per second. When the piston speed is particularly high, it may become impossible for the throttle duct 18, of the type shown in FIG. 2, to cause pusher member 15 to operate with a proper time lag, due to the high oil pressure.

More specifically, the amount of oil flowing through throttle duct 18 into the floating cylinder 14 during the extension stroke would become larger than the amount of oil returning through throttle duct 18 in the compression stroke. Thus, the accumulation of oil during repeating secondary vibrations would lift the pusher member 15 to close secondary valve 9. As graphically illustrated in FIG. 7, secondary valve 9 would be closed even if the oil damper is subjected to secondary vibrations when the piston speed exceeds 0.6 meter per second, thus leaving only primary valve 9 operative.

The embodiment of FIG. 4 further includes a releasing valve 29. In the operative stroke of the oil damper, the oil pressure pushes valve 29 downwardly to close radial port or ports 30. In the inoperative stroke of the oil damper, as the oil pressure becomes zero, valve 29 opens port or ports 30, under the bias of spring 31, so that floating cylinder 14 is restored to its original position rapidly. The throttle duct in this case is the radial port 18.

Figure 8:
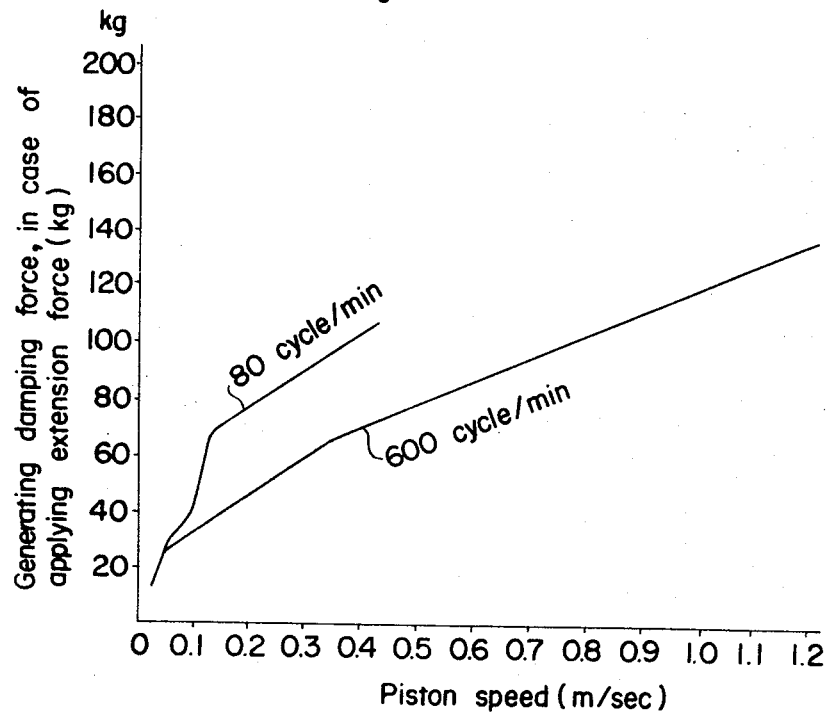

FIG. 8 graphically illustrates the relation between the generated damping force and the piston speed in the case of the embodiment of the invention shown in FIG. 4, at two different frequencies. The 80 cycle frequency represents the primary vibrations and the 600 cycle frequency represents the secondary vibrations.

In summary, it will be apparent that the invention provides a shock absorber of the oil damper type which obviates the problem of accommodating both the primary and secondary vibrations with a single unit, and that the shock absorber embodying the invention insures increased riding comfort under all conditions.

While specific embodiments of the invention have been shown and described in detail to illustrate the application of the principles of the invention, it will be understood that the invention may be embodied otherwise without departing from such principles.

What is claimed is:

1. A shock absorber of the oil damper type for use on automotive vehicles having bodies supported on axles through springs, and capable of damping efficiently both the natural low frequency primary vibrations occurring above the springs and the natural high frequency secondary vibrations occurring beneath the springs, said shock absorber comprising, in combination, a cylinder element; a piston element slidable in said cylinder element and dividing the latter into a high pressure chamber and a low pressure chamber; one element being constructed for connection to a vehicle axle and the other element being constructed for connection to a vehicle body; two pressure control valves each mounted on one of said elements; one of said valves constituting a primary valve having high damping characteristics effective to dampen said primary vibrations, and the other of said valves constituting a secondary valve having lower damping characteristics effective to dampen said secondary vibrations; said secondary valve including a resilient annular disc of thin hardened steel and performing its damping function by resilient deformation of said disc; frequency responsive pusher means including a throttling passage connected to said high pressure chamber to provide a time lag in the operation of said pusher means, said pusher means further including a pusher member engaging said disc and operable to move the disc into the closed position, and a releasing valve operable to negative flow resistance in said throttling passage during a return stroke of said pusher means; said pusher means being operatively associated with said secondary valve and operable, responsive to a recurrence of said primary vibrations,to render said secondary valve ineffective and operable, responsive to termination of said primary vibrations, to render said secondary valve effective again; hydraulic means operable to actuate said pusher member responsive to oil pressure in the high pressure chamber due to external forces applied to said shock absorber, to close said secondary valve; and spring means operable on said hydraulic means, responsive to decrease in the hydraulic pressure thereon, to move said pusher member to a position wherein said secondary valve is open; said shock absorber thereby operating without development of intermediate damping force in the frequency range between said two vibrations; whereby said shock absorber has damping characteristics selectively effective to dampen both said primary vibrations and said secondary vibrations.

2. A shock absorber of the oil damper type, as claimed in claim 1, including a second disk interposed between said hydraulically operated pusher means and said first mentioned disk,said second disk being constructed and arranged normally to exert no pressure on said first mentioned disk.

3. A shock absorber of the oil damper type, as claimed in claim 1, in which said shock absorber is a dual acting oil damper developing damping forces in both the compression and extension strokes thereof.

* * * * *